United States Patent
Bivins

(10) Patent No.: US 9,805,517 B2
(45) Date of Patent: Oct. 31, 2017

(54) INTEGRATING EXTERNAL ALGORITHMS INTO A FLEXIBLE FRAMEWORK FOR IMAGING VISUALIZATION DATA

(71) Applicant: Landmark Graphics Corporation, Houston, TX (US)

(72) Inventor: Gerrick O'Ron Bivins, Fulshear, TX (US)

(73) Assignee: LANDMARK GRAPHICS CORPORATION, Houston, TX (US)

(*) Notice: Subject to any disclaimer, the term of this patent is extended or adjusted under 35 U.S.C. 154(b) by 0 days.

(21) Appl. No.: 14/646,699

(22) PCT Filed: Jun. 3, 2014

(86) PCT No.: PCT/US2014/040721
§ 371 (c)(1),
(2) Date: May 21, 2015

(87) PCT Pub. No.: WO2015/187133
PCT Pub. Date: Dec. 10, 2015

(65) Prior Publication Data
US 2017/0076507 A1    Mar. 16, 2017

(51) Int. Cl.
*G06T 19/20* (2011.01)
*G06T 17/10* (2006.01)

(52) U.S. Cl.
CPC ............. *G06T 19/20* (2013.01); *G06T 17/10* (2013.01); *G06T 2200/24* (2013.01); *G06T 2219/2012* (2013.01); *G06T 2219/2016* (2013.01); *G06T 2219/2024* (2013.01)

(58) Field of Classification Search
None
See application file for complete search history.

(56) References Cited

U.S. PATENT DOCUMENTS

| | | | |
|---|---|---|---|
| 2007/0094299 A1 | 4/2007 | le Masne de Chermont | |
| 2007/0257924 A1 | 11/2007 | Quarre et al. | |
| 2009/0303233 A1* | 12/2009 | Lin | G06T 17/05 345/419 |
| 2013/0144566 A1* | 6/2013 | De Biswas | G06T 17/005 703/1 |
| 2014/0035940 A1* | 2/2014 | Dmitriev | G06T 15/04 345/582 |
| 2014/0063016 A1* | 3/2014 | Howson | G06T 15/80 345/426 |

OTHER PUBLICATIONS

Belleman, "Interactive Exploration in Virtual Environments", University of Amsterdam, 2003.*
Commissioner; International Search Report and the Written Opinion of the International Searching Authority; PCT/US14/40721; dated Feb. 6, 2015; 12 pgs.; ISA/KR.

(Continued)

*Primary Examiner* — Vu Nguyen
*Assistant Examiner* — Yu-Jang Tswei
(74) *Attorney, Agent, or Firm* — Polsinelli PC

(57) ABSTRACT

Systems and methods for integrating external algorithms into a flexible framework for imaging visualization data without altering the external algorithm to fit the flexible framework.

20 Claims, 8 Drawing Sheets

(56) References Cited

OTHER PUBLICATIONS

C. Pradal, et al.; PlantGL: A Python-based geometric library for 3D plant modelling at different scales; Graphical Models; Jan. 2009; 41 pgs.; vol. 71, Issue 1.
Anupam Agrawal, et al.; Real-time Photorealistic Visualisation of Large-scale Multiresolution Terrain Models; Defence Science Journal; Jan. 2007; pp. 149-162; vol. 57, No. 1.
Ashok Chandrasekhar, et al.; Interfacing Geometric Design Models to Analyzable Product Models with Multifidelity and Mismatched Analysis Geometry; Dec. 1999; 187 pgs.; Georgia Institute of Technology (Thesis).
Ron Yagel, David M Reed, Asish Law, Po-Wen Shih, and Naeem Shareef,Hardware Assisted Volume Rendering of Unstructured Grids by Incremental Slicing, Nov. 1996, 11 pages, Department of Computer and Information Science, The Ohio State University, United States.
James Ahrens, Berk Geveci, Charles Law, ParaView: An End-User Tool for Large Data Visualization, Handbook, Jan. 2005, 2 pages, Paraview, United States Visualization.
Commissioner; International Search Report and the Written Opinion of the International Searching Authority; PCT/US14/40721; dated Feb. 9, 2015; 12 pgs.; ISA/KR.

\* cited by examiner

INTEGRATING EXTERNAL ALGORITHMS INTO A FLEXIBLE FRAMEWORK FOR IMAGING VISUALIZATION DATA

CROSS-REFERENCE TO RELATED APPLICATIONS

This application and U.S. Pat. No. 8,736,600, which is incorporated by reference, are commonly assigned to Landmark Graphics Corporation. This application claims the priority of PCT Patent Application No. PCT/US14/40721, filed on Jun. 3, 2014, which is incorporated herein by reference.

STATEMENT REGARDING FEDERALLY SPONSORED RESEARCH

Not applicable.

FIELD OF THE DISCLOSURE

The present disclosure generally relates to systems and methods for integrating external algorithms into a flexible framework for imaging visualization data. More particularly, the present disclosure relates to integrating external algorithms into a flexible framework for imaging visualization data without altering the external algorithm to fit the flexible framework.

BACKGROUND

Typical commercialized petroleum reservoir visualization software helps petroleum and reservoir engineers and geoscientists see the results from static or dynamic simulations and visually compare iterative "what if" scenarios. Many reservoir models are often described as a disconnected curvilinear grid volume, also called a "3D grid," where each grid cell has clearly defined hexahedronal geometry. The software shows different views of the reservoir with particular attributes (e.g. gas saturation) of the reservoir. The edges, top, and bottom of the reservoir can be seen by rotating the view. Visualization software typically allows the representation of any simulation attribute, instant switching between attributes, and the ability to set data thresholds with unique displays of cells that are restricted to specified data ranges. A visualization model may include a single layer, or multi-layer views wherein cells are stripped away to reveal the inside of the model. They can also be constructed to show a full display of corner points and local refinement for grid volumes.

A 3D reservoir model may be presented as hexahedral grid cells, which can be topologically structured or unstructured and geometrically regular or irregular. Curvilinear grid volumes, which are topologically structured and geometrically irregular, are more typical in reservoirs and are therefore, of particular interest. A 3D grid may be defined as: cell=f(I, J, K)=(v1, v2 . . . v8, a1, a2 . . . an); where v1, v2 . . . and v8 are eight vertices for the cell and a1, a2 . . . and an are attributes. 3D grids are I layers thick, J cells wide, K cells deep, which contain cells with coordinates (I, J, K) referred to as grid coordinates. Grid Coordinates (I, J, K) are typically used in an index domain, while Cartesian (world) coordinates (x, y, z) are typically used in a sampling domain.

Research for unstructured volume visualization includes the widely used Projected Tetrahedral technique. Many other extended and enhanced algorithms have also been published. Another algorithm used for visualizing geoscience data is incremental slicing, which was first introduced by Yagel, et al. in *Hardware Assisted Volume Rendering of Unstructured Grids by Incremental Slicing*, IEEE Visualization, 1996, pp. 55-62. The basic idea behind this algorithm is to slice the whole grid volume along the viewing direction and render the slices from back to front. For surface volume rendering, the well known Marching Cubes algorithm can be used for rendering both regular and irregular grid cells. The challenge of scientific visualization, however, lies in determining which algorithm best fits a particular domain and task. In this respect, selecting a visualization software solution is largely dependent on the particular data domain because most visualization software solutions do not provide a flexible framework for using a preferred, external, visualization algorithm as-is or will require a substantial revision of the algorithm to fit the visualization software framework.

BRIEF DESCRIPTION OF THE DRAWINGS

The present disclosure is described below with references to the accompanying drawings in which like elements are referenced with like reference numerals, and in which.

DETAILED DESCRIPTION OF THE PREFERRED EMBODIMENTS

Figure 1:
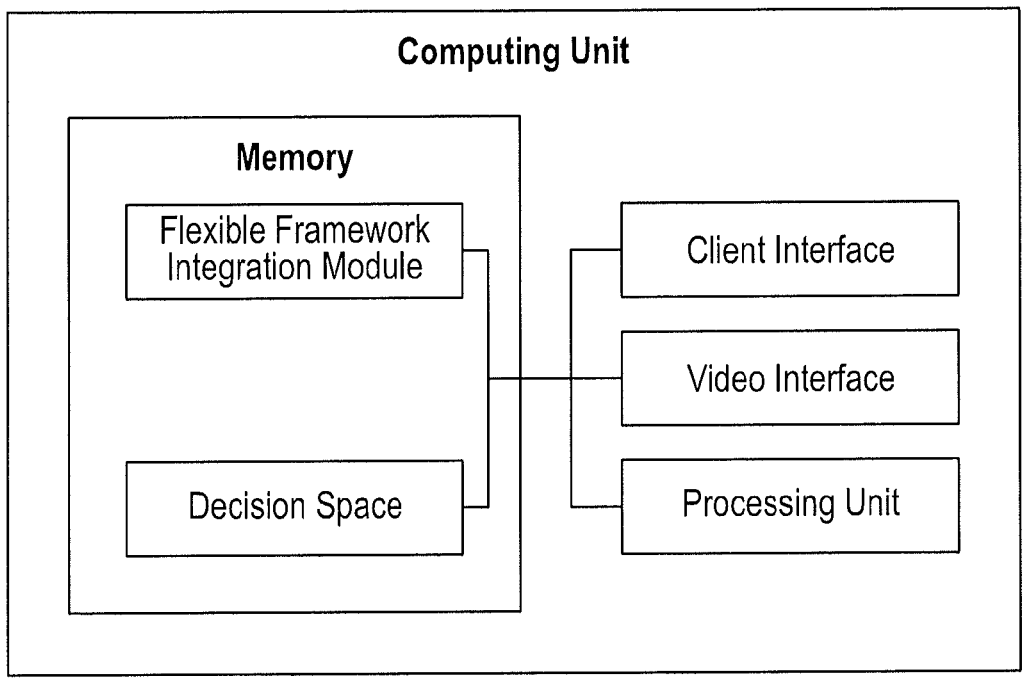
FIG. 1 is a block diagram illustrating one embodiment of a computer system for implementing the present disclosure.

The present disclosure overcomes one or more deficiencies in the prior art by providing systems and methods for integrating external algorithms into a flexible framework for imaging visualization data without altering the external algorithm to fit the flexible framework.

In one embodiment, the present disclosure includes a method for integrating external algorithms into a flexible framework for imaging visualization data, which comprises: i) selecting a valid visualization algorithm API; ii) selecting a visualization algorithm for the valid visualization algorithm API; iii) executing the visualization algorithm using visualization data and a computer processor; iv) translating results for the executed visualization algorithm to geometry primitives; v) applying interpolated attributes of the visualization data to the geometry primitives; vi) applying surface normal vectors to the interpolated attributes applied to the geometry primitives; vii) adding the surface normal vectors applied to the interpolated attributes to a visualization algorithm display; and viii) creating a new visualization algorithm display for a visualization algorithm probe using the surface normal vectors added to the visualization algorithm display.

In another embodiment, the present disclosure includes a non-transitory program carrier device tangibly carrying computer executable instructions for integrating external algorithms into a flexible framework for imaging visualization data, the instructions being executable to implement: i) selecting a valid visualization algorithm API; ii) selecting a visualization algorithm for the valid visualization algorithm API; iii) executing the visualization algorithm using visualization data; iv) translating results for the executed visualization algorithm to geometry primitives; v) applying interpolated attributes of the visualization data to the geometry primitives; vi) applying surface normal vectors to the interpolated attributes applied to the geometry primitives; vii) adding the surface normal vectors applied to the interpolated attributes to a visualization algorithm display; and viii) creating a new visualization algorithm display for a visualization algorithm probe using the surface normal vectors added to the visualization algorithm display.

In yet another embodiment, the present disclosure includes a non-transitory program carrier device tangibly carrying computer executable instructions for integrating external algorithms into a flexible framework for imaging visualization data, the instructions being executable to implement: i) selecting a valid visualization algorithm API; ii) selecting a visualization algorithm for the valid visualization algorithm API; iii) executing the visualization algorithm using visualization data; iv) translating results for the executed visualization algorithm, to geometry primitives; v) applying interpolated attributes of the visualization data to the geometry primitives; vi) applying surface normal vectors to the interpolated attributes applied to the geometry primitives; vii) adding the surface normal vectors applied to the interpolated attributes to a visualization algorithm display; viii) creating a new visualization algorithm display for a visualization algorithm probe using the surface normal vectors added to the visualization algorithm display; ix) converting the visualization data to an acceptable format using an input data factory from the valid visualization algorithm API; x) creating the visualization algorithm probe using the converted visualization data; and xi) creating the visualization algorithm display for the visualization algorithm probe.

The subject matter of the present disclosure is described with specificity, however, the description itself is not intended to limit the scope of the disclosure. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the present disclosure may be applied in the oil and gas industry, it is not limited thereto and may also be applied in other industries, such as medical imaging, to achieve similar results.

System Description

The present disclosure may be implemented through a computer-executable program of instructions, such as program modules, generally referred to as software applications or application programs executed by a computer. The software may include, for example, routines, programs, objects, components and data structures that perform particular tasks or implement particular abstract data types. The software forms an interface to allow a computer to react according to a source of input. DecisionSpace®, which is a commercial software application marketed by Landmark Graphics Corporation, may be used as an interface application to implement the present disclosure. The software may also cooperate with other code segments to initiate a variety of tasks in response to data received in conjunction with the source of the received data. The software may be stored and/or carried on any variety of memory such as CD-ROM, magnetic disk, bubble memory and semiconductor memory (e.g. various types of RAM or ROM). Furthermore, the software and its results may be transmitted over a variety of carrier media such as optical fiber, metallic wire and/or through any of a variety of networks, such as the Internet.

Moreover, those skilled in the art will appreciate that the disclosure may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof, in a computer system or other processing system.

Referring now to FIG. 1, a block diagram illustrates one embodiment of a system for implementing the present disclosure on a computer. The system includes a computing unit, sometimes referred to as a computing system, which contains memory, application programs, a client interface, a video interface, and a processing unit. The computing unit is only one example of a suitable computing environment and is not intended to suggest any limitation as to the scope of use or functionality of the disclosure.

The memory primarily stores the application programs, which may also be described as program modules containing computer-executable instructions, executed by the computing unit for implementing the present disclosure described herein and illustrated in FIGS. 1-5. The memory therefore, includes a flexible framework integration module, which enables the steps described in reference to FIGS. 3A-D, except steps 302, 304, 308, 312-319, 334, 340 and 374. The flexible framework integration module may integrate functionality from the remaining application programs illustrated in FIG. 1. In particular, DecisionSpace® may be used as an interface application to perform the remaining steps in FIGS. 3A-3D. Although DecisionSpace® may be used as interface application, other interface applications may be used, instead, or the flexible framework integration module may be used as a stand-alone application.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on, the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well known.

Figure 2A:
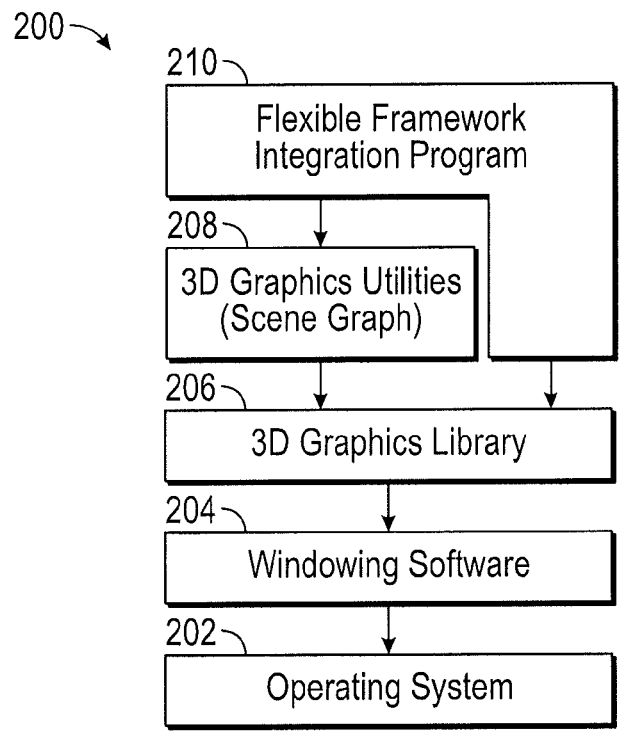
FIG. 2A is a block diagram illustrating one embodiment of a software program for implementing the present disclosure.

Referring now to FIG. 2A, a block diagram of a program for implementing the present disclosure on software is illustrated. The present disclosure may be implemented using hardware, software or a combination thereof, and may be implemented in a computer system or other processing system. One embodiment of a software or program structure 200 for implementing the present disclosure is shown in FIG. 2A. At the base of program structure 200 is an operating system 202. Suitable operating systems 202 include, for example, the UNIX® operating system, or Windows NT® from Microsoft Corporation, or other operating systems as would be apparent to one of skill in the relevant art.

Windowing software 204 overlays operating system 202. Windowing software 204 is used to provide various menus and windows to facilitate interaction with the user, and to obtain user input and instructions. Windowing software 204 can include, for example, Microsoft Windows™, X Window System™ (registered trademark of Massachusetts Institute of Technology), and MOTIF™ (registered trademark of Open Software Foundation Inc.). As would be readily apparent to one of skill in the relevant art, other menu and windowing software could also be used.

A 3D graphics library 206 overlays Windowing software 204. The 3D graphics library 206 is an API for 3D computer graphics. The functions performed by 3D graphics library 206 include, for example, geometric and raster primitives, RGBA or color index mode, display list or immediate mode, viewing and modeling transformations, lighting and shading, hidden surface removal, alpha blending (translucency), anti-aliasing, texture mapping, atmospheric effects (fog, smoke, haze), feedback and selection, stencil planes, and accumulation buffer.

A particularly preferred 3D graphics library 206 is OpenGL®. The OpenGL® API is a well known multiplatform industry standard that is hardware, window, and operating system independent. OpenGL® is designed to be callable from C, C++, FORTRAN, Ada and Java™ programming languages. OpenGL® performs each of the functions listed above for 3D graphics library 206. Some commands in OpenGL® specify geometric objects to be drawn, and others control how the objects are handled. All elements of the OpenGL® state, even the contents of the texture memory and the frame buffer, can be obtained by a client application using OpenGL®. OpenGL® and the client application may operate on the same or different machines because OpenGL® is network transparent. OpenGL® is described in more detail in the OpenGL® Programming Guide (ISBN: 0-201-63274-8) and the OpenGL® Reference Manual (ISBN: 0-201-63276-4), the entirety of both of which are incorporated herein by reference.

3D graphics utilities 208 overlay the 3D graphics library 206. The 3D graphics utilities 208 is an API for creating real-time, multi-processed 3D visual simulation graphics applications. The 3D graphics utilities 208 provide functions that bundle together graphics library state control functions such as lighting, materials, texture, and transparency. These functions track state and the creation of display lists that can be rendered later. A particularly preferred set of 3D graphics utilities is offered in Picasso.

A flexible framework integration program 210 overlays 3D graphics utilities 208 and the 3D graphics library 206. The flexible framework integration program 210 interacts with, and uses the functions carried out by, each of the 3D graphics utilities 208, the 3D graphics library 206, the windowing software 204, and the operating system 202 in a manner known to one of skill in the relevant art.

The flexible framework integration program 210 of the present disclosure is preferably written in an object oriented programming language to allow the creation and use of objects and object functionality. A particularly preferred object oriented programming language is Java™. In carrying out the present disclosure, the flexible framework integration program 210 creates one or more probe objects. As noted above, the probe objects created and used by the flexible framework integration program 210 are also referred to herein as grid probes or probes. Flexible framework integration program 210 manipulates the probe objects so that they have the following attributes.

A probe corresponds to a sub-set of the original data. Particularly, a probe defines a sub-set that is less than the complete data set of cells for a grid volume. A probe could be configured to be equal to or coextensive with the complete data set of cells for a grid volume.

Figure 2B:
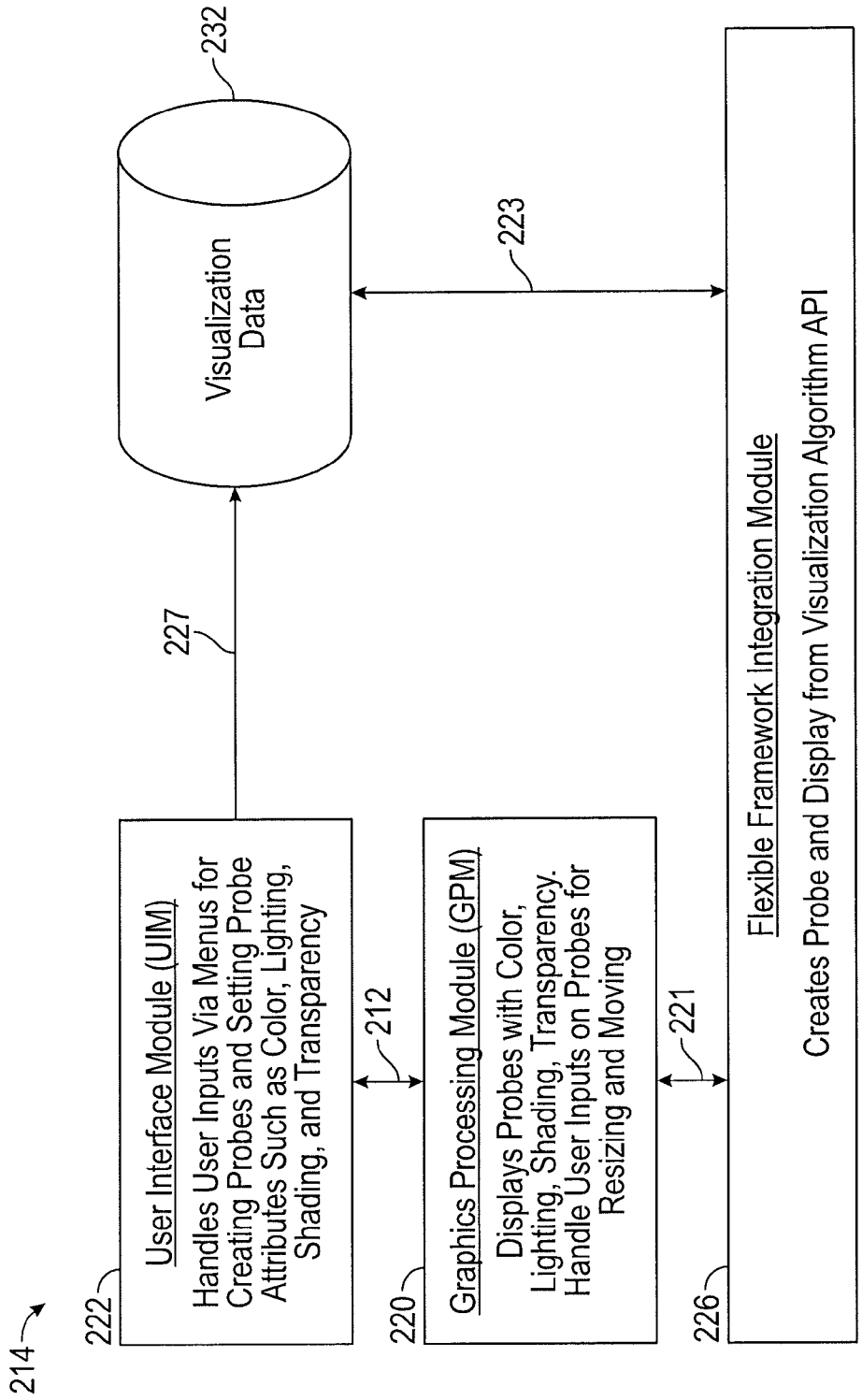
FIG. 2B is a block diagram illustrating an architecture for the software program in FIG. 2A.
Figure 3A:
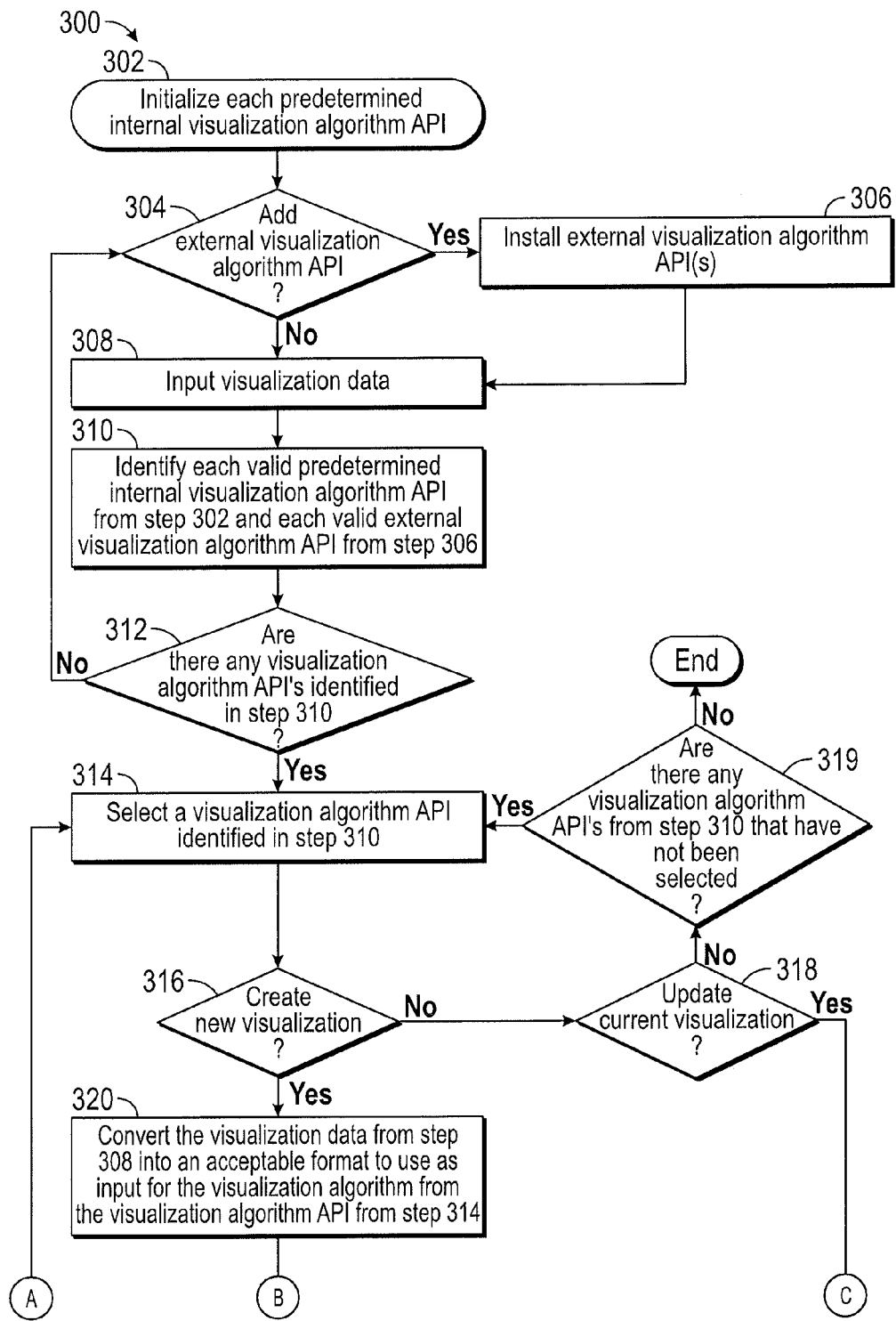
FIGS. 3A-3D are flow diagrams illustrating one embodiment of a method for implementing the present disclosure.
Figure 3B:
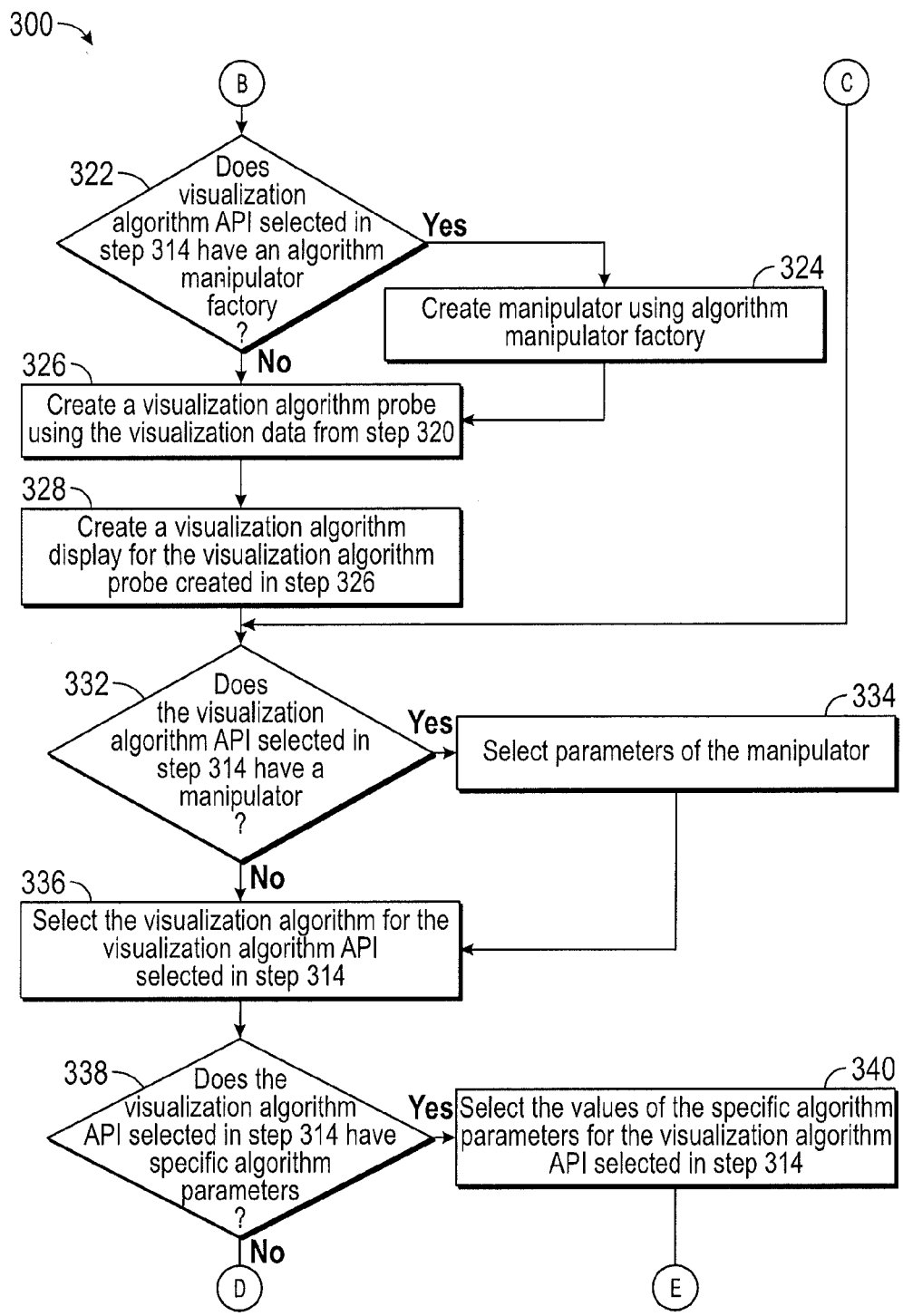
Figure 3C:
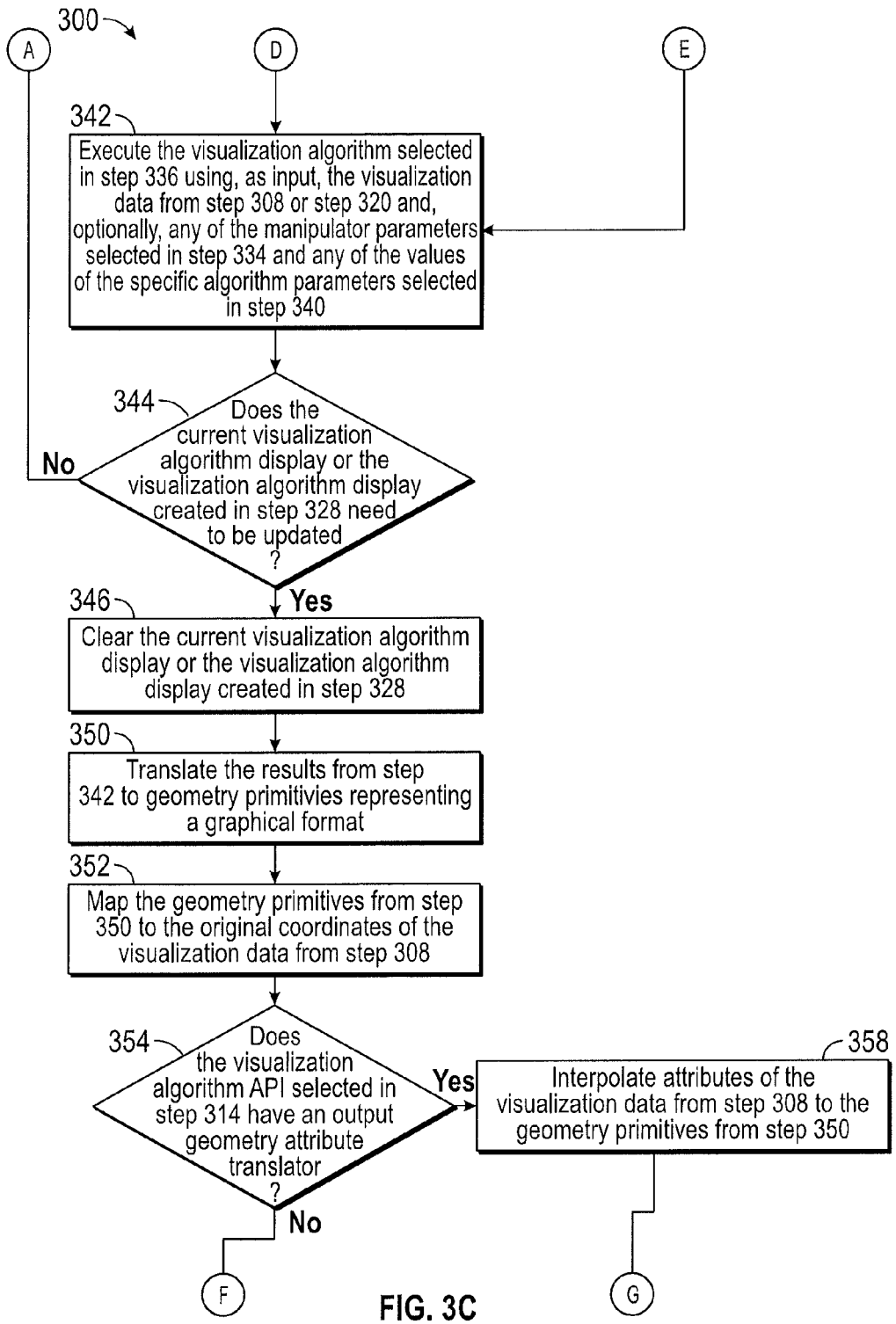
Figure 3D:
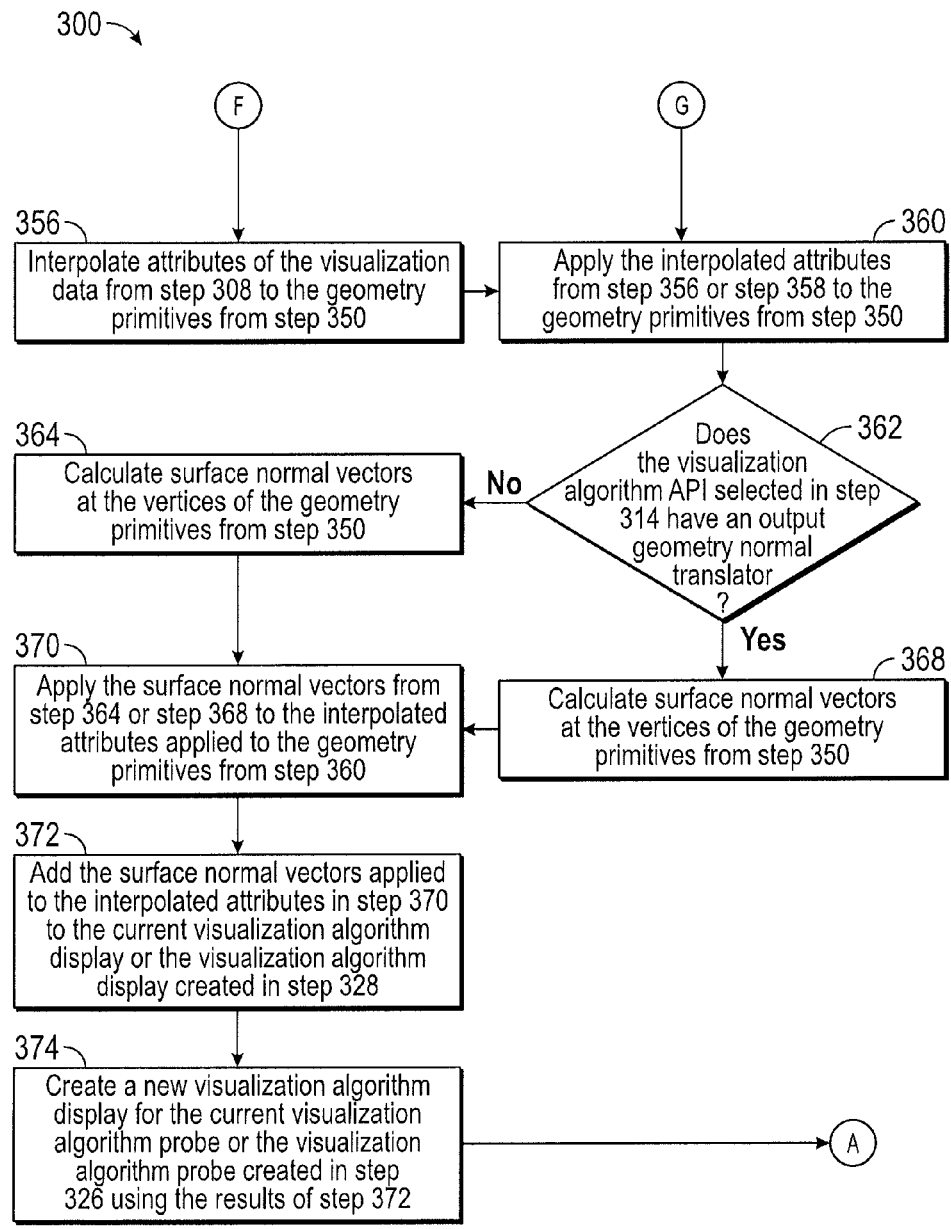

Referring now to FIG. 2B, a block diagram of an architecture 214 for the program 200 in FIG. 2A is illustrated.

The 3D graphics utilities 208 include a User Interface Module (UIM) 222 and a Graphics Processing Module (GPM) 220. The flexible framework integration program 210 includes a Flexible Framework Integration Module 226. UIM 222 and GPM 220 communicate via a bi-directional pathway 212. UIM 222 interacts with Visualization Data 232 through pathway 227.

Grid data from Visualization Data 232 is transferred to GPM 220 through Flexible Framework Integration Module 226 via bi-directional pathways 221, 223. Visualization Data 232 stores the grid data in a manner well known to one of skill in the relevant art, which may include grid data representing multiple different volumes.

UIM 222 handles the user interface to receive commands, instructions, and input data from the user. UIM 222 interfaces with the user through a variety of menus through which the user can select various options and settings, either through keyboard selection or through one or more user-manipulated input devices, such as a mouse or a 3D pointing device. UIM 222 receives user input as the user manipulates the input device to move, size, shape, etc. a grid probe.

UIM 222 inputs the identification of one or more grid volumes from Visualization Data 232 to use for imaging and analysis. When a plurality of grid volumes are used, the data value for each of the plurality of grid volumes represents a different physical parameter or attribute for the same geographic space. By way of example, a plurality of grid volumes could include a geology volume, a temperature volume, and a water-saturation volume.

UIM 222 inputs information to create one or more probes. Such information may include, for example, probe type, size, shape, and location. Such information may also include, for example, the type of display and imaging attributes such as color, lighting, shading, and transparency (or opacity). By adjusting opacity as a function of data value, certain portions of the grid volume are more transparent, thereby allowing a viewer to see through surfaces. As would be readily apparent to one skilled in the art, data values with greater opacity (less transparency) will mask the imaging or display of data values with lower opacity (more transparency). Conversely, data values will less opacity and greater transparency will permit the imaging or display of data values with greater opacity and lower transparency.

UIM 222 receives input from the user for sizing and shaping the probes. As described in more detail below, in a preferred embodiment of the present disclosure, the shape and/or size of a probe may be changed by clicking onto manipulators or the probe display and making changes in the dimensions of the probe in one or more directions. A manipulator refers to a designated graphical representation on a surface of the probe, which may be used to move, reshape or re-size the probe. Manipulators may also be used to identify boundaries or extents for creating certain types of probes. A manipulator is preferably displayed in a color that is different from the colors being used to display the features or physical parameters of the grid data. UIM 222 receives input from the user to move the position or location of a probe within the grid volume. In a preferred embodiment, a user manipulates a mouse to click onto a manipulator or the probe display and move or re-size the probe.

UIM 222 also receives input from the user regarding the content of the displayed image. For example, the user can preferably select the content of the displayed image. The content of the displayed image could include only the probe, i.e., its intersection with the grid volume. Additionally, the probe could be displayed either with or without a bounding box that defines the outer geometry of the probe.

To carry out the foregoing functions, UIM 222 communicates via bi-directional pathway 212 with GPM 220 that carries out the display and imaging.

GPM 220 processes data for imaging probes with the color, lighting, shading, transparency, and other attributes selected by the user. To do so, GPM 220 uses the functions available through 3D graphics library 206 and 3D graphics utilities 208 described above. The user can select (through UIM 222) to display only the one or more probes that have been created. Alternatively, the user can select to display one or more probes, as well as the grid volume outside of the probes, i.e. cells within the grid volume that do not intersect any of the probes that are being displayed. Probes that are being displayed may be referred to herein as active probes.

GPM 220 processes the re-shaping and move requests that are received by UIM 222 from the user. GPM 220 draws the re-shaped probe in accordance with the user-selected attributes (color, lighting, shading, transparency, etc.). As the user inputs a change in shape for a probe, the image with selected attributes is re-drawn sufficiently fast to be perceived in real-time by the user. Similarly, GPM 220 draws the probe in the new position or location in accordance with the user-selected attributes (color, lighting, shading, transparency, etc.). As the user moves the probe through the grid volume, the image of the probe with selected attributes is re-drawn sufficiently fast to be perceived in real-time by the user.

To carry out the foregoing functions, GPM 220 communicates via bi-directional pathway 212 with UIM 222 so that the information requested by the user is imaged or displayed with the selected attributes. GPM 220 obtains the needed data from Visualization Data 232 by sending a data request through the Flexible Framework Integration Module 226 via bi-directional pathways 221, 223.

The Flexible Framework Integration Module 226 selects a bounding box based on input received from UIM 222 through GPM 220. The Flexible Framework Integration Module 226 then sends a request to Visualization Data 232 via bi-directional pathway 223 for visualization data that corresponds to the selected bounding box extents. The Flexible Framework Integration Module 226 receives visualization data corresponding to the bounding box extents from Visualization Data 232 via bi-directional pathway 223. The Flexible Framework Integration Module 226 then creates (builds) the selected probe and display using the visualization data and transmits the selected probe and display to GPM 220 for rendering an image of the selected visualization algorithm API.

The primary function of the visualization algorithm API is therefore, to extract the appropriate grid data within the bounding box extents at the request of Flexible Framework Integration Module 226. The visualization algorithm API in the Flexible Framework Integration Module 226 receives requests for visualization data from Flexible Framework Integration Module 226. The visualization algorithm API extracts the required sub-grid within the probe bounding box extents of the visualization data. The Flexible Framework Integration Module 226 then renders the output for display.

Method Description

Referring now to FIGS. 3A-3D, the flow diagrams illustrate one embodiment of a method 300 for implementing the present disclosure. The method 300 represents a flexible framework that may be used for scientific visualization as a means of providing insight into visualization data by displaying the data in various graphical illustrations. The goal of a flexible framework like the method 300 is to expose relationships and features of the data that are not easily discoverable from simply looking at the data in its raw form.

In step 302, each predetermined internal visualization algorithm API is initialized using techniques well known in the art. The visualization algorithm API is the API that the method 300 delegates to for algorithm specific data processing. The API can be broken down into four parts:

A. Algorithm Specification
B. Algorithm Graphics Factory
C. Algorithm View Type
D. Algorithm Manipulator Factory (Optional)

The following describes how each part is used by the method 300 in a deployed application, to allow each visualization algorithm API to be integrated.

A—The algorithm specification is called by the method 300 to validate algorithms for selected input and to create the display of the visualization algorithm. One aspect of the algorithm specification defines data conversions into and out of the visualization algorithm. It also defines the operations to perform on the data to calculate the visualization. The algorithm specification includes three separate, but related, functions, which are described in further detail below:
  I. Input Translation Specification—defines if and how the method 300 can convert visualization data into a format that is suitable for the algorithm execution specification to accept;
  II. Output Translation Specification—defines how the method 300 can convert the output of the algorithm execution specification into a format that is suitable for displaying graphically; and
  III. Algorithm Execution Specification—defines the specific visualization algorithm that the method 300 can call to create the input translation specification and the output translation specification.

A I—Input Translation Specification
  a. Input Data Factory—converts the visualization data into a suitable format for the specific visualization algorithm, typically following the adapter pattern in object oriented programming; and
  b. Input Domain Data Validator—validates if the input data factory can convert the visualization into a suitable format for the specific visualization algorithm, which is how filters for the type of visualization data that can be accepted are defined.

A II—Output Translation Specification
  a. Input/Output Geometry Mapper—creates a mapping of the output of the specific visualization algorithm back to the original location in the visualization data. The mapping can be used, for instance, to look up an attribute value in original visualization data to apply to the output of the specific visualization algorithm at the corresponding location;
  b. Output Geometry Translator—converts the output of the specific visualization algorithm to a graphical format (referred to as output geometry) that the graphics factory can render and display;
  c. Output Geometry Normal Translator (Optional)—calculates normal vectors at each vertex of the output geometry. This is optional because there are existing algorithms for calculating the normal vectors of polygons, which the method 300 can use as a default. However, if for any reason, the default functionality is not preferred, this option may be utilized; and
  d. Output Geometry Attribute Translator (Optional)—interpolates attributes from the visualization data to the output geometry. This is optional because the attributes can be interpolated using the mapping defined by the input/output geometry mapper. However, if for any reason, the default functionality is not preferred, this option may be utilized.

A III—Algorithm Execution Specification
  a. Visualization Algorithm—the implementation of a specific visualization algorithm. Using the result of calling the input data factory and any parameters defined by the algorithm parameters, as input, this computes the output as implemented by the method 300; and
  b. Algorithm Parameters (Optional)—parameters specific to the implementation of a specific visualization algorithm. Some specific visualization algorithms may require extra parameters as input to the execution. For example, the X Cartesian coordinate location of an "x slice plane" visualization algorithm may be required for the algorithm to execute properly. This allows the requirement of such parameters to be defined and the method 300 will supply them to the visualization algorithms for execution.

B—The algorithm graphics factory is called by the method 300 to create the required components to integrate the output of the visualization algorithm into the underlying graphical display system. After creation of the required components, any changes to the output of the execution of the visualization algorithm may trigger the display to be updated.

C—The algorithm view type simply defines the graphical displays that a visualization algorithm can be viewed in.

D—The algorithm manipulator factory allows the user of the method 300 to define a graphical widget that can be used to send parameters to the algorithm for execution. If defined, the method 300 will create the graphical representation of the widget and add it to the display. Typically the manipulator is tied to 1 or more of the parameters specified in algorithm execution specification but that is not required. The method 300 will pass any parameters defined by the manipulator to the visualization algorithm and it is up to the visualization algorithm implementation whether or not to use the parameters.

In step 304, the method 300 determines whether to add an external visualization algorithm API based on each predetermined internal visualization algorithm API from step 302, available external visualization algorithm API's and instructions from the client interface and/or the video interface described further in reference to FIG. 1. If the method 300 determines not to add an external visualization algorithm API, then the method 300 proceeds to step 308. If the method 300 determines to add an external visualization algorithm API, then the method 300 proceeds to step 306.

Figure 4:
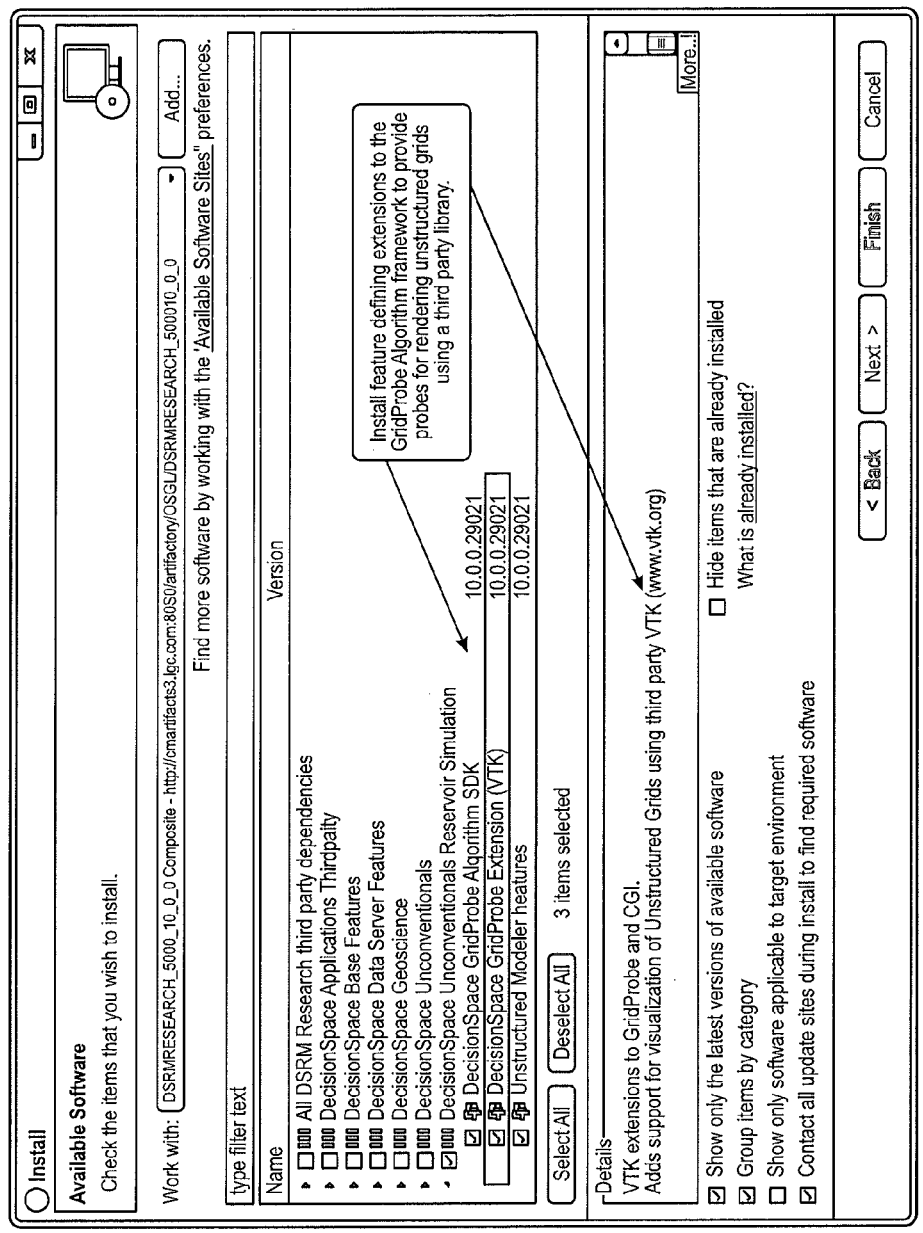
FIG. 4 is an exemplary graphical user interface illustrating the installation of an external visualization algorithm according to step 306 in FIG. 3A.

In step 306, one or more external visualization algorithm API's are installed using techniques well known in the art and the client interface and/or the video interface described further in reference to FIG. 1. Each visualization algorithm API is the API that the method 300 delegates to for algorithm specific data processing. The API can be broken down into the same four parts described in step 302, however, may be customized and/or supplied from a source external to the method 300. In FIG. 4, an exemplary graphical user interface illustrates the installation of an external visualization algorithm called GridProbe.

In step 308, visualization data is input using the client interface and/or the video interface described further in reference to FIG. 1. Visualization data may include any data that may be graphically represented in a way to gain insight into the data and possibly gain a better understanding of the data. Such data therefore, may include output from an oil/gas reservoir simulation on a grid or output from an MRI in the medical field.

In step 310, each valid predetermined internal visualization algorithm API from step 302 and each valid external visualization algorithm API from step 306 is identified based on the visualization data input in step 308 and the API algorithm view type from step 302 and/or step 306. The input domain data validator and the API algorithm view type from step 302 and/or step 306 are used to identify which predetermined internal visualization algorithm API's from step 302 and which external visualization algorithm API's from step 306 are valid to the extent it can accept the visualization data from step 308 as input for the respective API algorithm view type.

In step 312, the method 300 determines if there are any predetermined internal visualization algorithm API's or any external visualization algorithm API's identified in step 310. If there are no predetermined internal visualization algorithm API's and no external visualization algorithm API's identified in step 310, then the method returns to step 304. If there is at least one predetermined internal visualization algorithm API or at least one external visualization algorithm API, then the method proceeds to step 314.

In step 314, a predetermined internal visualization algorithm API or an external visualization algorithm API identified in step 310 is selected using the client interface and/or the video interface described further in reference to FIG. 1.

In step 316, the method 300 determines whether to create a new visualization based on any current visualizations, or lack thereof, and instructions from the client interface and/or the video interface described further in reference to FIG. 1. If the method 300 determines to create a new visualization, then the method 300 proceeds to step 320. If the method 300 determines not to create a new visualization, then the method 300 proceeds to step 318.

In step 318, the method 300 determines whether to update a current visualization based on one or more current visualizations and instructions from the client interface and/or the video interface described further in reference to FIG. 1. If the method 300 determines to update a current visualization, then the method 300 proceeds to step 332. If the method 300 determines not to update a current visualization, then the method 300 proceeds to step 319.

In step 319, the method 300 determines if there are any predetermined internal visualization algorithm API's or external visualization algorithm API's identified in step 310 that have not been selected in step 314. If there is another predetermined internal visualization algorithm API or another external visualization algorithm API identified in step 310 that has not been selected in step 314, then the method 300 returns to step 314. Otherwise, the method 300 ends.

In step 320, the visualization data from step 308 is converted into an acceptable format to use as input for the visualization algorithm from the visualization algorithm API selected in step 314 using the input data factory from the visualization algorithm API selected in step 314.

In step 322, the method 300 determines if the visualization algorithm API selected in step 314 has an algorithm manipulator factory. If the visualization algorithm API selected in step 314 does not have an algorithm manipulator factory, then the method 300 proceeds to step 326. If the visualization algorithm API selected in step 314 does have an algorithm manipulator factory, then the method 300 proceeds to step 324.

In step 324, a manipulator is created in the form of a graphical widget using the algorithm manipulator factory from the visualization algorithm API selected in step 314. The manipulator may be used to convert changes in the graphical widget properties or state into input parameters for the visualization algorithm from the visualization algorithm API selected in step 314.

In step 326, a visualization algorithm probe is created using the visualization data from step 320 and techniques well known in the art.

In step 328, a visualization algorithm display is created for the visualization algorithm probe created in step 326 using techniques well known in the art.

In step 332, the method 300 determines if the visualization algorithm API selected in step 314 has a preexisting manipulator or a manipulator created in step 324. If the visualization algorithm API selected in step 314 has no manipulator, then the method 300 proceeds to step 336. If the visualization algorithm API selected in step 314 has a manipulator, then the method 300 proceeds to step 334.

In step 334, the parameters of the preexisting manipulator or the manipulator created in step 324 are selected using the client interface and/or the video interface described further in reference to FIG. 1.

In step 336, the visualization algorithm for the visualization algorithm API selected in step 314 is selected.

In step 338, the method 300 determines if the visualization algorithm API selected in step 314 has specific algorithm parameters. If the visualization algorithm API selected in step 314 has no specific algorithm parameters, then the method 300 proceeds to step 342. If the visualization algorithm API selected in step 314 has specific algorithm parameters, then the method 300 proceeds to step 340.

In step 340, the values of the specific algorithm parameters for the visualization algorithm API selected in step 314 are selected using the client interface and/or the video interface described further in reference to FIG. 1.

In step 342, the visualization algorithm selected in step 336 is executed using, as input, the visualization data from step 308 or step 320 and, optionally, any of the manipulator parameters selected in step 334 and any of the values of the specific algorithm parameters selected in step 340.

In step 344, the method 300 determines if the current visualization algorithm display or the visualization algorithm display created in step 328 needs to be updated based on whether there are results for step 342. If there are no results for step 342, then the visualization algorithm display created in step 328 does not need to be updated and the method 300 returns to step 314. If there are results for step 342, then the visualization algorithm display created in step 328 needs to be updated and the method 300 proceeds to step 346.

In step 346, the current visualization algorithm display or the visualization algorithm display created in step 328 is cleared.

In step 350, the results from step 342 are translated to geometry primitives representing a graphical format using the output geometry translator for the visualization algorithm API selected in step 314.

In step 352, the geometry primitives representing a graphical format from step 350 are mapped to the original coordinates of the visualization data from step 308 using the input/output geometry mapper for visualization algorithm API selected in step 314.

In step 354, the method 300 determines if the visualization algorithm API selected in step 314 has an output geometry attribute translator. If the visualization algorithm API selected in step 314 has an output geometry attribute translator, then the method 300 proceeds to step 358. If the visualization algorithm API selected in step 314 has no output geometry attribute translator, then the method 300 proceeds to step 356.

In step 356, attributes of the visualization data from step 308 are interpolated to the geometry primitives representing a graphical format from step 350 using the mapped geometry primitives from step 352 and techniques well known in the art.

In step 358, attributes of the visualization data from step 308 are interpolated to the geometry primitives representing a graphical format from step 350 using the output geometry attribute translator of the visualization algorithm API selected in step 314.

In step 360, the interpolated attributes from step 356 or step 358 are applied to the geometry primitives representing a graphical format from step 350 using techniques well known in the art.

In step 362, the method 300 determines if the visualization algorithm API selected in step 314 has an output geometry normal translator. If the visualization algorithm API selected in step 314 has an output geometry normal translator, then the method 300 proceeds to step 368. If the visualization algorithm API selected in step 314 has no output geometry normal translator, then the method 300 proceeds to step 364.

In step 364, surface normal vectors at the vertices of the geometry primitives representing a graphical format from step 350 are calculated using any well-known default output geometry normal algorithm.

In step 368, surface normal vectors at the vertices of the geometry primitives representing a graphical format from step 350 are calculated using the output geometry normal translator of the visualization algorithm API selected in step 314.

In step 370, the surface normal vectors from step 364 or step 368 are applied to the interpolated attributes applied to the geometry primitives representing a graphical format in step 360 using techniques well known in the art.

In step 372, the surface normal vectors applied to the interpolated attributes in step 370 are added to the current visualization algorithm display or the visualization algorithm display created in step 328 using techniques well known in the art.

Figure 5:
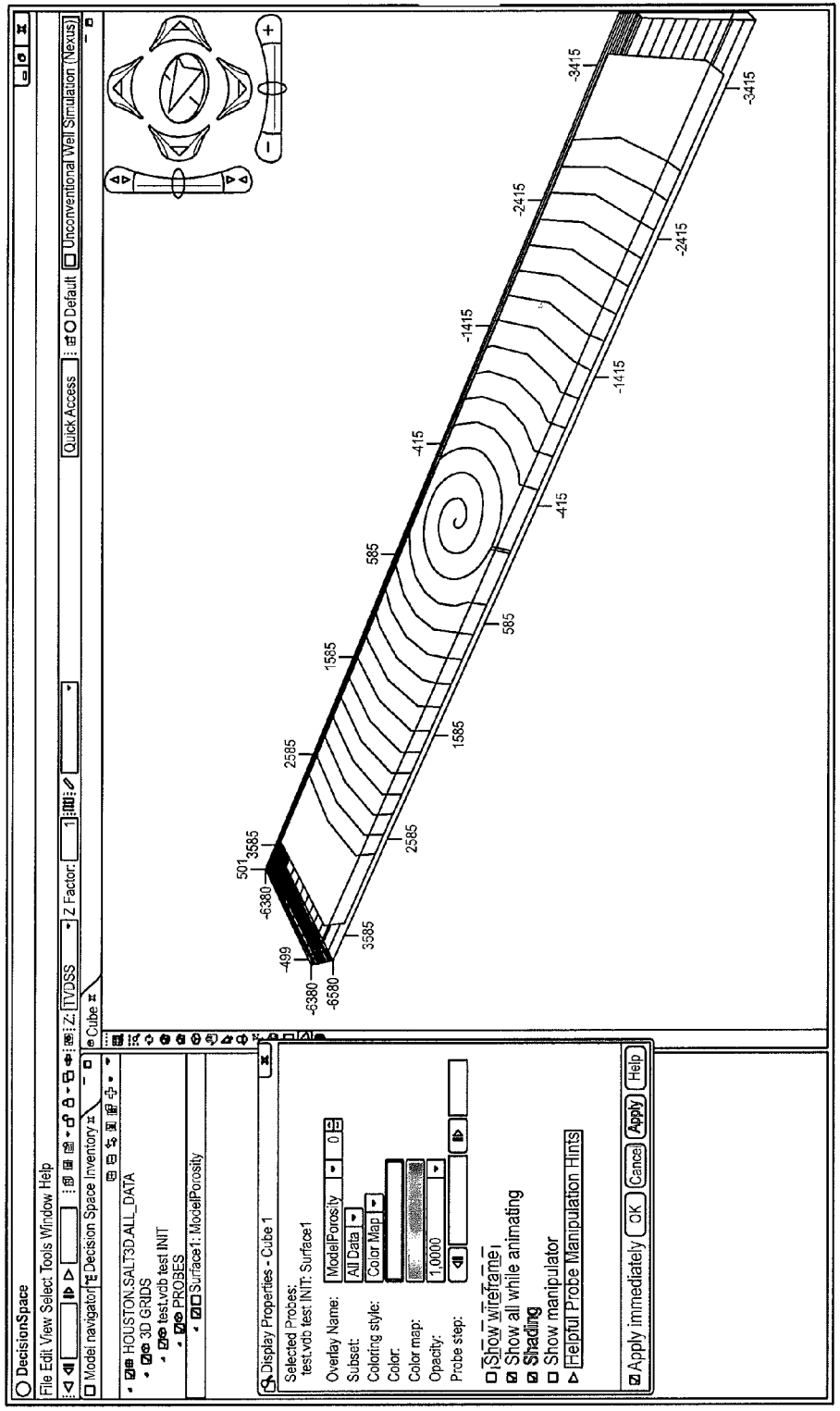
FIG. 5 is a display of a visualization algorithm probe illustrating an exemplary visualization algorithm display created according step 374 in FIG. 3D.

In step 374, a new visualization algorithm display is created for the current visualization algorithm probe or the visualization algorithm probe created in step 326 using the results of step 372 and techniques well known in the art. In FIG. 5, a display of a visualization algorithm probe illustrates an exemplary visualization algorithm display created according to step 374. The method 300 returns to step 314.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A method for integrating external algorithms into a flexible framework for imaging visualization data, which comprises:

selecting an internal visualization algorithm API, from one or more internal visualization algorithm APIs;
selecting one or more internal visualization algorithms for the selected internal visualization algorithm API;
adding an external visualization algorithm API based on the selected internal visualization algorithm API;
selecting one or more external visualization algorithms for the selected external visualization algorithm API;
validating the selected internal and selected external visualization algorithms are configured to accept visualization data;
executing the visualization algorithm using visualization data and a computer processor;
translating results for the executed visualization algorithm to geometry primitives;
applying interpolated attributes of the visualization data to the geometry primitives;
applying surface normal vectors to the interpolated attributes applied to the geometry primitives;
adding the surface normal vectors applied to the interpolated attributes to a visualization algorithm display; and
creating a new visualization algorithm display for a visualization algorithm probe using the surface normal vectors added to the visualization algorithm display.

2. The method of claim 1, wherein the valid visualization algorithm API is one of a predetermined internal visualization algorithm API and an external visualization algorithm API.

3. The method of claim 1, further comprising:
converting the visualization data to an acceptable format using an input data factory from the valid visualization algorithm API;
creating a manipulator in the form of a graphical widget using an algorithm manipulator factory from the valid visualization algorithm API;
creating the visualization algorithm probe using the converted visualization data; and
creating the visualization algorithm display for the visualization algorithm probe.

4. The method of claim 3, wherein the visualization algorithm is executed using the converted visualization data, parameters selected for the manipulator and values selected for specific algorithm parameters for the valid visualization algorithm API.

5. The method of claim 1, further comprising mapping the geometry primitives to original coordinates for the visualization data using an input/output geometry mapper for the valid visualization algorithm API.

6. The method of claim 5, wherein the interpolated attributes are interpolated to the geometry primitives using one of the mapped geometry primitives and an output geometry attribute translator for the valid visualization algorithm API.

7. The method of claim 1, wherein the surface normal vectors are calculated at vertices of the geometry primitives using an output geometry normal translator for the valid visualization algorithm API.

8. A non-transitory program carrier device tangibly carrying computer executable instructions for integrating external algorithms into a flexible framework for imaging visualization data, the instructions being executable to implement:

selecting an internal visualization algorithm API, from one or more internal visualization algorithm APIs;
selecting one or more internal visualization algorithms for the selected internal visualization algorithm API;

adding an external visualization algorithm API based on the selected internal visualization algorithm API;

selecting one or more external visualization algorithms for the selected external visualization algorithm API;

validating the selected internal and selected external visualization algorithms are configured to accept visualization data;

executing the visualization algorithm using visualization data and a computer processor;

translating results for the executed visualization algorithm to geometry primitives;

applying interpolated attributes of the visualization data to the geometry primitives;

applying surface normal vectors to the interpolated attributes applied to the geometry primitives;

adding the surface normal vectors applied to the interpolated attributes to a visualization algorithm display; and creating a new visualization algorithm display for a visualization algorithm probe using the surface normal vectors added to the visualization algorithm display.

9. The program carrier device of claim 8, wherein the valid visualization algorithm API is one of a predetermined internal visualization algorithm API and an external visualization algorithm API.

10. The program carrier device of claim 8, further comprising:

converting the visualization data to an acceptable format using an input data factory from the valid visualization algorithm API;

creating a manipulator in the form of a graphical widget using an algorithm manipulator factory from the valid visualization algorithm API;

creating the visualization algorithm probe using the converted visualization data; and creating the visualization algorithm display for the visualization algorithm probe.

11. The program carrier device of claim 10, wherein the visualization algorithm is executed using the converted visualization data, parameters selected for the manipulator and values selected for specific algorithm parameters for the valid visualization algorithm API.

12. The program carrier device of claim 8, further comprising mapping the geometry primitives to original coordinates for the visualization data using an input/output geometry mapper for the valid visualization algorithm API.

13. The program carrier device of claim 12, wherein the interpolated attributes are interpolated to the geometry primitives using one of the mapped geometry primitives and an output geometry attribute translator for the valid visualization algorithm API.

14. The program carrier device of claim 8, wherein the surface normal vectors are calculated at vertices of the geometry primitives using an output geometry normal translator for the valid visualization algorithm API.

15. A non-transitory program carrier device tangibly carrying computer executable instructions for integrating external algorithms into a flexible framework for imaging visualization data, the instructions being executable to implement:

selecting an internal visualization algorithm API, from one or more internal visualization algorithm APIs;

selecting one or more internal visualization algorithms for the selected internal visualization algorithm API;

adding an external visualization algorithm API based on the selected internal visualization algorithm API;

selecting one or more external visualization algorithms for the selected external visualization algorithm API;

validating the selected internal and selected external visualization algorithms are configured to accept visualization data;

executing the visualization algorithm using visualization data;

translating results for the executed visualization algorithm to geometry primitives;

applying interpolated attributes of the visualization data to the geometry primitives;

applying surface normal vectors to the interpolated attributes applied to the geometry primitives;

adding the surface normal vectors applied to the interpolated attributes to a visualization algorithm display; and creating a new visualization algorithm display for a visualization algorithm probe using the surface normal vectors added to the visualization algorithm display;

converting the visualization data to an acceptable format using an input data factory from the valid visualization algorithm API;

creating the visualization algorithm probe using the converted visualization data; and creating the visualization algorithm display for the visualization algorithm probe.

16. The program carrier device of claim 15, wherein the valid visualization algorithm API is one of a predetermined internal visualization algorithm API and an external visualization algorithm API.

17. The program carrier device of claim 15, wherein the visualization algorithm is executed using the converted visualization data, parameters selected for the manipulator and values selected for specific algorithm parameters for the valid visualization algorithm API.

18. The program carrier device of claim 15, further comprising mapping the geometry primitives to original coordinates for the visualization data using an input/output geometry mapper for the valid visualization algorithm API.

19. The program carrier device of claim 18, wherein the interpolated attributes are interpolated to the geometry primitives using one of the mapped geometry primitives and an output geometry attribute translator for the valid visualization algorithm API.

20. The program carrier device of claim 15, wherein the surface normal vectors are calculated at vertices of the geometry primitives using an output geometry normal translator for the valid visualization algorithm API.

* * * * *